United States Patent [19]
Maxwell et al.

[11] Patent Number: 4,655,105
[45] Date of Patent: Apr. 7, 1987

[54] WORKPIECE AND METHOD OF FORMING THE SAME

[75] Inventors: Bryan L. Maxwell, South Euclid; James J. Urbanic, Concord, both of Ohio

[73] Assignee: Leemax Manufacturing Corporation, Mentor, Ohio

[21] Appl. No.: 646,898

[22] Filed: Aug. 31, 1984

[51] Int. Cl.$^4$ .............................. B23B 1/00; B23B 5/08
[52] U.S. Cl. ..................................... 82/1 C; 82/38 R; 82/39; 138/121
[58] Field of Search .................. 82/1 C, 38 R, 39; 408/19; 138/121

[56] References Cited

U.S. PATENT DOCUMENTS

| | | | |
|---|---|---|---|
| 2,728,254 | 12/1955 | Siekmann et al. | 82/38 R |
| 2,851,916 | 9/1958 | Grandy et al. | 82/1 C |
| 3,145,513 | 8/1964 | Porath | 82/39 |
| 3,372,721 | 3/1968 | James et al. | 82/38 R |
| 3,561,300 | 2/1971 | Peasley | 82/1 C |
| 3,724,302 | 4/1973 | Randich | 82/47 R |
| 3,935,766 | 2/1976 | Masters | 82/38 R |

FOREIGN PATENT DOCUMENTS

| | | | |
|---|---|---|---|
| 617169 | 7/1978 | U.S.S.R. | 82/1 C |
| 686821 | 9/1979 | U.S.S.R. | 82/1 C |
| 880633 | 11/1981 | U.S.S.R. | 82/1 C |
| 1073003 | 2/1984 | U.S.S.R. | 82/1 C |
| 1105282 | 7/1984 | U.S.S.R. | 82/1 C |

Primary Examiner—Nicholas P. Godici
Assistant Examiner—Jerry Kearns
Attorney, Agent, or Firm—Tarolli, Sundheim & Covell

[57] ABSTRACT

An improved method of forming a relatively thin elongated metal product is disclosed. In forming the product, a workpiece is first tensioned with a relatively high axial tension force and then is tensioned with a reduced axial tension force. The workpiece is supported against sidewise movement with a pair of rolls having outer side surfaces which engage the surface of the workpiece throughout the axial extent of a major portion of the workpiece. The thickness of the workpiece is reduced along at least a major portion of the workpiece while the reduced tension force is maintained and the workpiece is supported by the rolls. Although the method of the present invention could be utilized to form solid workpieces, it is particularly advantageous in forming tubular workpieces having thin wall sections with a thickness of 0.050 inches or less.

22 Claims, 8 Drawing Figures

WORKPIECE AND METHOD OF FORMING THE SAME

BACKGROUND OF THE INVENTION

The present invention relates to a method of accurately machining an elongated and relatively thin workpiece.

Difficulty may be encountered in machining long thin workpieces to have an accurate outside diameter. The problem becomes particularly pronounced when a tubular workpiece is to be machined to form a product having a relatively thin wall, that is a wall with a thickness of 0.050 inches or less. These difficulties result from the fact that the elongated workpiece tends to bend or deflect during machining. Thus, if axial compression forces are applied to opposite ends of the workpiece when the workpiece is mounted between the centers of a lathe, the central portion of the workpiece tends to bow or bend. When a cutting tool is pressed against the workpiece, the workpiece also tends to bow or bend. Therefore, in many instances, long thin workpieces have been formed by methods other than machining them.

BRIEF SUMMARY OF THE INVENTION

The present invention relates to a new and improved method of forming an elongated workpiece, such as a rod or tube. In forming the workpiece, it is first subjected to a relatively high axial tension force in order to straighten the workpiece. If this relatively high axial tension force is maintained during a machining operation, exessive elongation of the workpiece may occur. However, in order to avoid bowing and/or whipping of the workpiece as it is rotated about its central axis, a reduced tension force is maintained during machining of the workpiece.

Sidewise deflection of the workpiece during machining is avoided by supporting the workpiece with a pair of rolls. Each of the rolls has an axial extent which is at least as great as the axial extent of a major portion of a cylindrical outer side surface of the workpiece.

During machining of the workpiece, the workpiece is rotated about its central axis while the reduced tension is maintained and while the rolls support the workpiece against sidewise movement. A cutting tool is then used to cut away material from the workpiece and reduce the diametral thickness of the workpiece.

It is contemplated that the present method may be used to reduce the relatively thick side wall of a tubular workpiece to a thickness of 0.050 inches or less. If desired, relatively thick wall sections may be left between thin wall sections on the workpiece. Although the present method is particularly well adapted to the forming of thin walled tubular products, it is contemplated that the method may be used to accurately form relatively long solid rods.

Accordingly, it is an object of this invention to provide a new and improved method of producing products from an elongated workpiece and wherein the diametral thickness of the workpiece is reduced while the workpiece is axially tensioned, rotated about its central axis and supported by a pair of rolls having an axial extent which is at least as great as the axial extent of a major portion of the workpiece.

BRIEF DESCRIPTION OF THE DRAWINGS

The foregoing and other objects and features of the present invention will become more apparent upon a consideration of the following description taken in connection with the accompanying drawing wherein.

DESCRIPTION OF ONE SPECIFIC PREFERRED EMBODIMENT OF THE INVENTION

Figure 1:
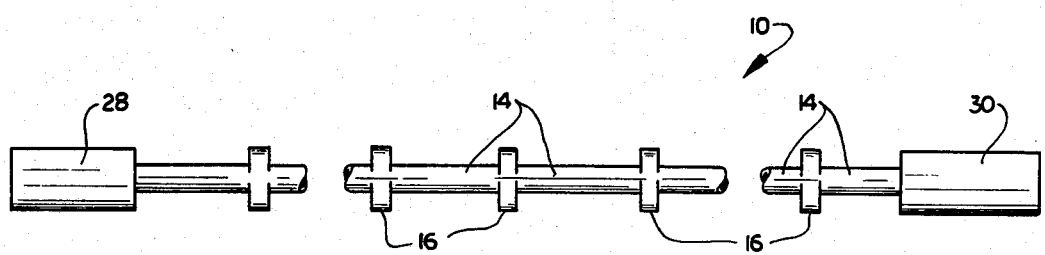
FIG. 1 is a plan view of a tubular product formed by the method of the present invention.
Figure 2:
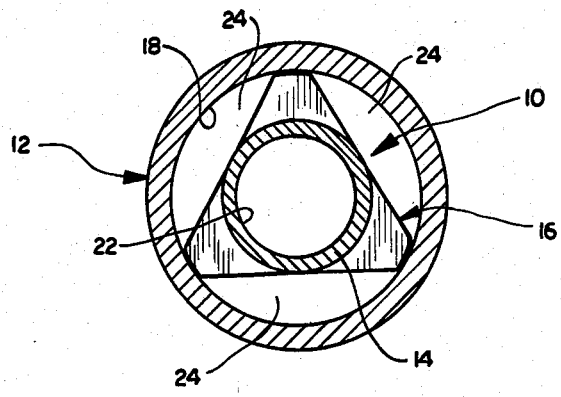
FIG. 2 is an end view illustrating the tubular product of FIG. 1 in an outer tube and illustrating the manner in which projections on the tubular product hold it away from an inside surface of the outer tube.

An inner tube or product 10 is illustrated in FIG. 1 and is but one of many different products which can be formed using the method of the present invention. The tube 10 is intended for use in an assembly in which the inner tube 10 is enclosed by an outer tube or housing 12 (FIG. 2). The inner tube 10 has a plurality of thin wall sections 14 disposed between thick wall sections 16 (FIG. 1). Although the thick wall sections or nodes 16 are initially formed to have an annular configuration, they are ground or machined to have the generally triangular configuration shown in FIG. 2. When the inner tube 10 is inserted into the outer tube 12, the thick wall sections 16 engage a cylindrical inner side surface 18 of the outer tube 12 and support the thin wall sections 14 in a spaced apart relationship with the outer tube.

The thick wall sections or nodes 16 are spaced along the length of the inner tube 10 so that when the outer tube 12 and inner tube are bent after being assembled as shown in FIG. 2, the relatively thick wall sections or nodes 16 function to maintain the thin wall sections 14 in a spaced apart relationship with the inner side surface 18 of the outer tube 12 around the bends in the tube. Although the inner tube 10 and outer tube 12 could be used in many different environments, it is contemplated that they may be used in connection with the a fuel line for an aircraft engine. Thus, the inner tube 10 has a cylindrical inner side wall 22 which defines a primary fuel flow passage. The spaces 24 between the thick wall sections 16 and the inner side surface 18 of the outer tube 12 provides secondary fuel flow passages.

Although the dimensions of the inner tube 10 could vary depending upon fuel flow requirements of the particular engine within which it is to be used, in one specific instance, the inner tube 10 had an overall length of approximately 7.3 inches. The inner tube had nine thick wall sections 16 having an axial extent of approximately 0.05 inches and ten thin wall sections 14 having an axial extent which varied between 0.3 and 0.6 inches. This specific inner tube had generally cylindrical end sections 28 and 30 (FIG. 1) with an axial extent of approximately 0.75 inches. The thin wall sections 14 were formed with an outside diameter of 0.095 inches and an inside diameter of 0.060 inches. It should be understood that the foregoing specific dimensions of the inner tube 10 have been set forth herein merely for purposes of clarity of illustration and the invention may be used to make many different solid or tubular products having dimensions other than these specific dimensions.

When the inner tube 10 is to be formed, a tubular workpiece 34 (see FIG. 3) having a relatively thick side wall is gripped by a collet chuck 36 which is held against axial movement and by a second collet chuck 38. To straighten the workpiece 34, a relatively large axial tension force is applied to the workpiece by the collet chuck 38 in the manner indicated schematically by the arrow 42 in FIG. 3. In one specific instance, the force used to straighten the workpiece 34 was approximately 150 lbs.

Figure 3:
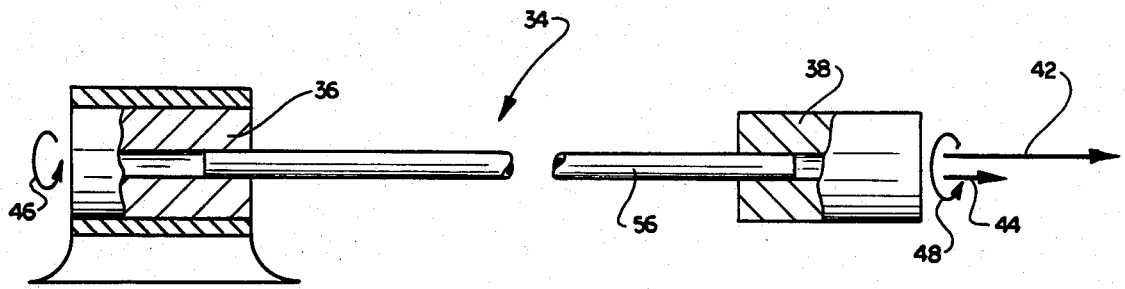
FIG. 3 is a schematic illustration depicting the manner in which a relatively large axial tension force is first applied to a workpiece and then a reduced tension force is applied to the workpiece during the forming of the tubular product of FIG. 1.

If the relatively large force, indicated by the arrow 42 in FIG. 3, is maintained on the workpiece 34 during the forming of the thin wall sections 14 (FIG. 1), objectionable elongation of the workpiece occurs at the thin wall sections. Therefore, before machining of a workpiece 34, the axial tension force is reduced, in one specific instance to a value of approximately 15 lbs., in the manner illustrated schematically by the arrow 44 in FIG. 3.

The straightened workpiece 34 is rotated about its central axis by the collet chucks 36 and 38 in the manner indicated schematically by the arrows 46 and 48 in FIG. 3. Although the speed at which the workpiece 34 is rotated will vary depending upon the material from which the workpiece is formed, it is contemplated that the workpiece may be rotated at a speed of between 5,000 and 6,000 revolutions per minute. In one specific instance, the workpiece was a stainless tube having an outside diameter of approximately 0.0164 inches an inside diameter of approximately 0.060 inches. The workpiece has an overall length of approximately 8.2 inches. Of course, the dimensions of the workpiece 34 will vary depending upon the desired dimensions of the product 10.

Figure 4:
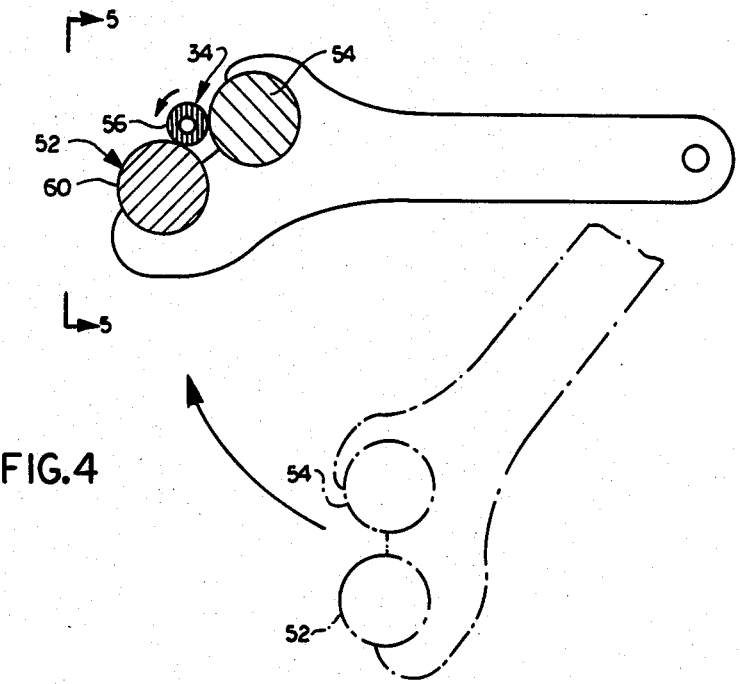
FIG. 4 is a schematic illustration depicting the manner in which a pair of rolls are brought into supporting engagement with an outer side surface of the workpiece of FIG. 3.
Figure 5:
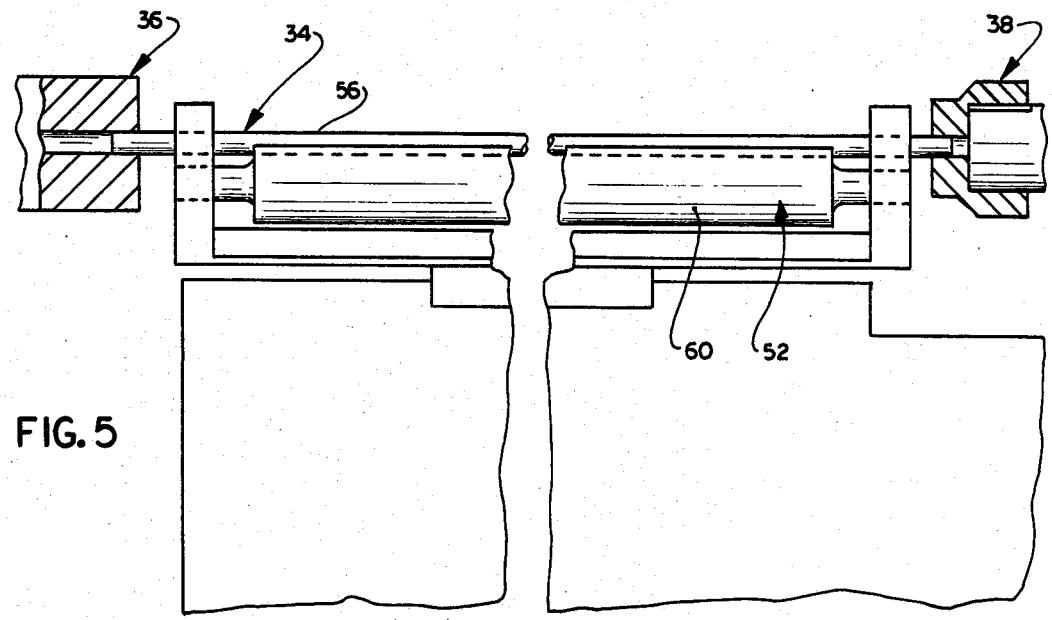
FIG. 5 is an elevational view, taken generally along the line 5—5 of FIG. 4, illustrating the manner in which the relatively long rolls support the workpiece throughout a major portion of the length of the workpiece.

During high speed rotation of the long and relatively thin tubular workpiece 34, the workpiece tends to whip and bow or deflect when subjected to machining forces even though the reduced axial tension is maintained on the workpiece. Therefore, the workpiece 34 is supported by a pair of rolls 52 and 54 during machining (FIGS. 4 and 5). While the workpiece 34 is being mounted in the collet chucks 36 and 38, the rolls 52 and 54 are advantageously disposed to one side in the retracted position shown in dashed lines in FIG. 4. Once the workpiece has been straightened by the application of the relatively large axial tension force, the rolls 52 and 54 are swung upwardly into abutting engagement with the cylindrical outer side wall 56 of the tubular workpiece 34.

Figure 6:
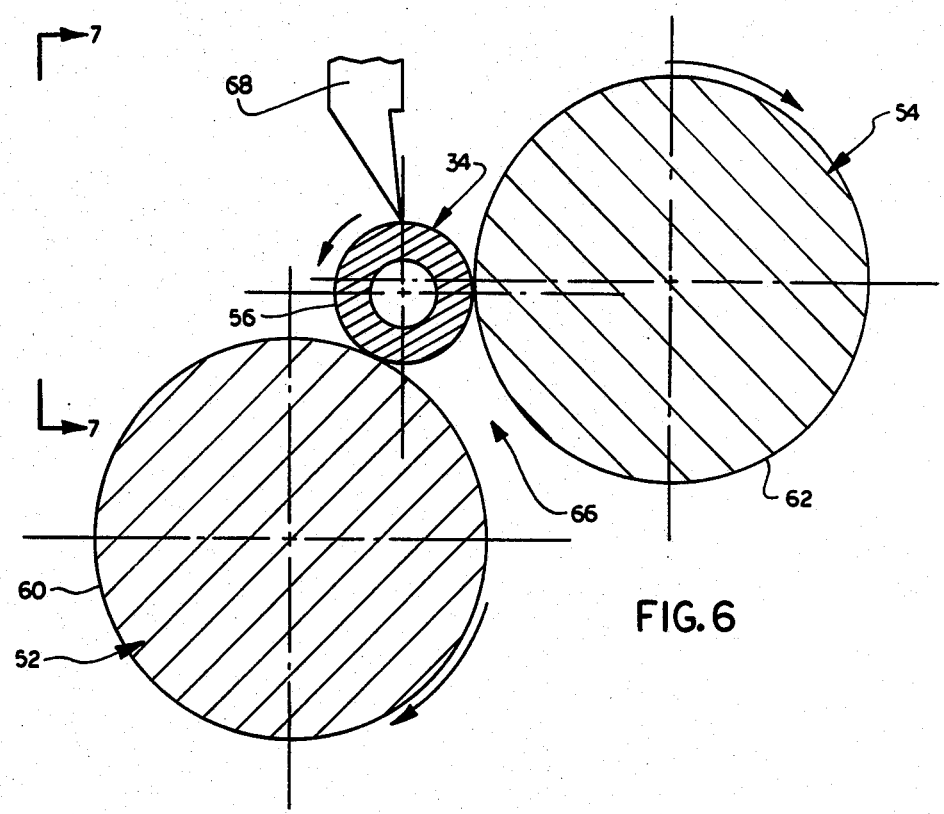
FIG. 6 is a schematic illustration depicting the manner in which the rolls support the workpiece during the cutting of material from the workpiece to reduce its diametral thickness.

Each of the rolls 52 and 54 has an axial extent which is slightly greater than the axial extent of the portion of the tubular workpiece 36 to be cut away to form the thin wall sections 14. Thus, the roller 52 has a continuous cylindrical outer side surface 60 which is disposed in abutting engagement with the cylindrical outer side surface 56 of the workpiece 34 for substantially the entire length of the workpiece (FIG. 5). The roller 54 has a continuous cylindrical outer side surface 62 (FIG. 6) with a central axis which is parallel to the central axis of the roller 52. The outer side surface 62 of the roller 54 is of the same length as the cylindrical surface 60 of the roller 52. The areas of engagement between the rollers 52 and 54 and the cylindrical outer side surface 56 of the tubular workpiece 34 are coextensive along the workpiece.

During machining of the tubular workpiece 34, the rolls 52 and 54 are pressed firmly against the outer side surface 56 of the workpiece. This results in the rolls 52 and 54 being rotated in a clockwise direction (as viewed in FIG. 6) under the influence of frictional drive forces transmitted between the workpiece 34, which is rotating in a counterclockwise direction as viewed in FIG. 6, and the rolls. In order to urge the tubular workpiece 34 toward a nip 66 formed between the rolls 52 and 54 under the influence of forces applied against the workpiece by a cutting tool 68, the center of rotation of the roll 54 is offset above the center of rotation of the roll 34, while the center of rotation of the roll 52 is disposed beneath the center of rotation of the workpiece 34 in the manner illustrated in FIG. 6.

Figure 7:
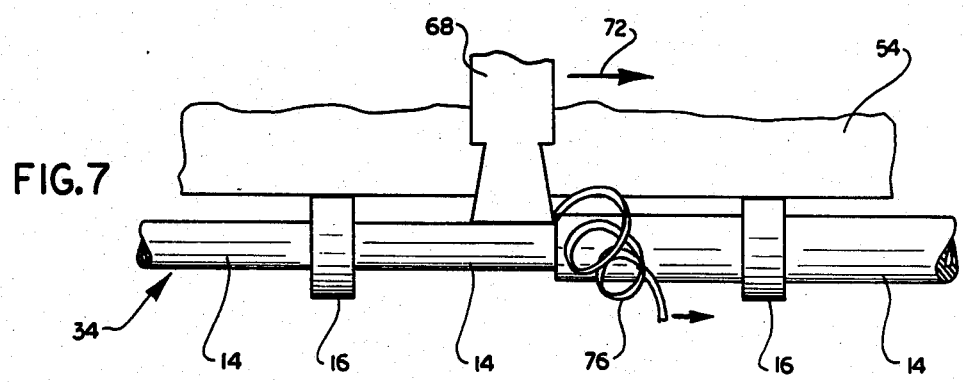
FIG. 7 is a schematic plan view, taken generally along the line 7—7 of FIG. 6, illustrating the manner in which a chip curls forwardly from the leading edge of a tool during machining of the workpiece.

To reduce the thickness of the sidewall of the tubular workpiece 34, the cutting tool 68 is moved axially along the workpiece, in the manner illustrated schematically in FIG. 7. As the cutting tool 68 is moved axially along the workpiece 34, it cuts material from the side wall of the workpiece at locations between the locations where the thick wall sections 16 are to be formed. The method of the present invention is particularly advantageous when used to form products having thin wall sections of a radial thickness of 0.050 inches or less.

When the cutting tool 68 reaches the location where a thick wall section 16 is to be formed, the tool is moved outwardly clear of the thick wall section 16. This leaves the cylindrical outer side surface of the thick wall section 16 in abutting engagement with the side surfaces of the rollers 52 and 54. Thus, the original side surface area 56 of the workpiece 34 remains in engagement with the rollers 52 and 54 at the thick wall sections 16 during the cutting away of the workpiece to form the thin wall sections 14.

During the cutting of material from the workpiece 34, a helical or curled chip 76 (FIG. 7) is formed. By experimentation, it has been determined that if the workpiece is cut with a tool and at a speed which allow the chip 76 to curl off behind the tool 68, the chip will wrap around the workpiece 34 and cause one or more of the thin wall tube sections to bend or break. In accordance with a feature of the present invention, the tool 68 has a positive rake and is moved at a relatively high speed along the workpiece 34 so that the chip 76 curls forwardly from the front of the tool 68. The chip 76 then falls downwardly away from the workpiece 34.

The tool 68 is repetitively moved along the workpiece 34 until the wall thicknesses at the thin wall sections 14 have been reduced to a desired thickness. The tool is then moved along the outer side surfaces of the thick wall sections 16 to give them a finish cut. The resulting workpiece 34 has relatively large diameter thick wall sections 16 and relatively small diameter thin wall sections 14 (see FIG. 8).

Figure 8:
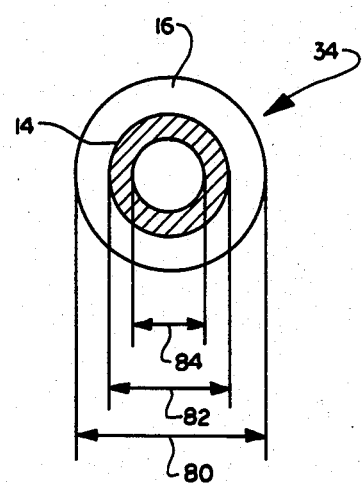
FIG. 8 is a sectional view of the workpiece after it has been machined.

When the inner tube 10 of FIG. 1 is to be made with the dimensions previously set forth herein, the thick wall section 16, has a diameter, indicated at 80 in FIG. 8, of approximately 0.163 inches. The thin wall section 14 has an outside diameter, indicated at 82 in FIG. 8, of 0.095 inches with a tolerance of −0.000 inches and +0.005 inches. The workpiece 34 has its original inside diameter, indicated at 84 in FIG. 8, of 0.060 inches. The workpiece 34 can be accurately machined to the foregoing dimensions of the thin wall section 64 since a continuous axial tension force is maintained on the workpiece and since the workpiece is continuously supported by the rolls 52 and 54 during machining of the workpiece. The thick wall sections 16 are then ground to provide the generally triangular configuration shown in FIG. 2.

Although the method of the present invention has been described herein in conjunction with a specific product, that is the inner tube 10, it is contemplated that the method will be used to make many different products. Some of these products may be made from tubular workpieces, similar to the workpiece 34, while other products may be made from solid workpieces. Of course, the specific dimensions of the products will depend upon the desired characteristics of the products.

In view of the foregoing description, it is apparent that the present invention relates to a new and improved method of forming an elongated workpiece, such as a rod or tube. In forming the workpiece 34, it is first subjected to a relatively high axial tension force 42 in order to straighten the workpiece. If this relatively high axial tension force is maintained during a machining operation, exessive elongation of the workpiece 34 may occur at the thin wall sections 14. However, in order to avoid bowing and/or whipping of the workpiece 34 as it is rotated about its central axis, a reduced tension force 44 is continuously maintained during machining of the workpiece.

Sidewise deflection of the workpiece during machining is avoided by supporting the workpiece 34 with a pair of rolls 52 and 54. Each of the rolls 52 and 54 has an axial extent which is at least as great as the axial extent of a major portion of a cylindrical outer side surface 56 of the workpiece 34.

During machining of the workpiece 34, the workpiece is rotated about its central axis while the reduced tension force 34 is maintained and while the rolls 52 and 54 support the workpiece against sidewise movement. A cutting tool 68 is then used to cut away material from the workpiece 34 and reduce the diametral thickness of the workpiece at the thin wall section 14.

It is contemplated that the present method may be used to reduce the relatively thick side wall of a tubular workpiece 34 to a thickness of 0.050 inches or less. If desired, relatively thick wall sections 16 may be left between thin wall sections 14 on the workpiece. Although the present method is particularly well adapted to the forming of thin walled tubular products, it is contemplated that the method may be used to accurately form relatively long solid rods.

Having described one specific preferred embodiment of the invention, the following is claimed.

1. A method of making a tubular product having a side wall with axially extending cylindrical thin wall sections having a thickness of 0.050 inches or less and annular thick side wall sections between the thin wall sections, the thin wall sections having a combined axial extent which is substantially greater than the combined axial extent of the thick side wall sections, said method comprising the steps of providing an elongated tubular workpiece having a relatively thick side wall and cylindrical outer side surface, axially tensioning the workpiece, said step of axially tensioning the workpiece including applying a relatively large axial tension force to the workpiece and reducing the relatively large axial tension force, rotating the workpiece about its central axis at a speed of between 5,000 and 6,000 revolutions per minute, supporting the workpiece against sidewise movement with a pair of rolls having cylindrical outer side surfaces with an axial extent which is at least as great as the axial extent of a major portion of the cylindrical outer side surface of the workpiece, said step of supporting the workpiece with a pair of rolls including engaging the outer side surface of the workpiece with the outer side surfaces of the rolls throughout the length of the outer side surfaces of the rolls, and thereafter reducing the radial thickness of the sidewall of the workpiece to 0.050 inches or less at a plurality of spaced apart locations along the workpiece at areas of engagement of the rolls with the outer side surface of the workpiece while continuing to perform said steps of axially tensioning the workpiece with the reduced tension force, rotating the workpiece at a speed of between 5,000 and 6,000 revolutions per minute and supporting the workpiece with a pair of rolls, said step of reducing the thickness of the side wall of the workpiece at spaced apart locations includes leaving annular sections having a relatively large radial thickness between and projecting radially outwardly from areas of reduced thickness, said step of continuing to support the workpiece includes engaging the annular sections with the outer side surfaces of the rolls with the outer side surfaces of the rolls spaced from the workpiece at the areas of reduced thickness.

2. A method comprising the steps of providing an elongated workpiece having a generally cylindrical outer side surface, said step of providing an elongated workpiece includes the step of providing a workpiece having a relatively thick tubular side wall upon which the cylindrical outer side surface of the workpiece is disposed, axially tensioning the workpiece, rotating the workpiece about its central axis, supporting the workpiece against sidewise movement with an elongated roll having an axial extent which is at least as great as the axial extent of a major portion of the cylindrical outer side surface of the workpiece, and reducing the diametral thickness of the workpiece along at least a major portion of the axial extent of the roll while continuing to perform said steps of axially tensioning the workpiece, rotating the workpiece and supporting the workpiece against sidewise movement, said step of reducing the diametral thickness of the workpiece includes reducing the thickness of the side wall of the workpiece to 0.050 inches or less.

3. A method as set forth in claim 2 wherein said step of reducing the thickness of the workpiece includes repeatedly moving a cutting tool along a path which is coextensive with at least a major portion of the axial extent of the roll.

4. A method as set forth in claim 2 wherein said step of tensioning the workpiece includes the steps of initially applying a relatively large axial tension force to the workpiece, reducing the axial tension force to less than one half of the relatively large tension force, and maintaining the reduced tension force on the workpiece throughout the step of reducing the diametral thickness of the workpiece.

5. A method as set forth in claim 2 wherein said step of reducing the thickness of the workpiece includes leaving portions of the outer side surface of the workpiece in abutting engagement with the roll at axially spaced apart support locations along the workpiece and cutting material from the workpiece at locations between the support locations.

6. A method as set forth in claim 2 wherein said step of rotating the workpiece includes rotating the workpiece at speed of between 5,000 and 6,000 revolutions per minute.

7. A method as set forth in claim 2 wherein said step of reducing the thickness of the workpiece includes the steps of moving a cutting tool along the workpiece and forming a chip which curls off the workpiece in the same direction as in which the cutting tool is moving.

8. A method as set forth in claim 2 wherein said step of reducing the diametral thickness of the workpiece includes the step of leaving a plurality of annular rings of material separated by portions of reduced diameter, said step of continuing to support the workpiece includes engaging the roll with the rings of material.

9. A method comprising the steps of providing an elongated tubular workpiece having a relatively thick side wall, rotating the workpiece about its central axis, supporting the workpiece against sidewise movement with a pair of rolls having cylindrical side surfaces with an axial extent which is at least as great as the axial extent of a major portion of the cylindrical outer side surface of the workpiece, said step of supporting the workpiece with a pair of rolls includes engaging the outer side surface of the workpiece with the outer side surfaces of the rolls throughout the length of the outer side surfaces of the rolls, and, thereafter, reducing the thickness of the side wall of the workpiece to 0.050 inches or less at a plurality of spaced apart locations along the wokrpiece while continuing to rotate the workpiece and support the workpiece with the pair of rolls, said step of reducing the thickness of the side wall of the workpiece at spaced apart locations includes leaving annular sections having a relatively large thickness between and projecting outwardly from areas of reduced thickness, said step of continuing to support the workpiece includes engaging the annular sections with the outer side surfaces of the rolls while maintaining the outer side surfaces of the rolls spaced from the areas of reduced thickness.

10. A method as set forth in claim 9 further including the steps of applying a relatively large axial tension force to the workpiece before performing said step of reducing the thickness of the side wall of the workpiece to thereby straighten the workpiece, reducing the axial tension force applied to the workpiece, and maintaining the application of the reduced axial tension force to the workpiece during performance of said step of reducing the thickness of the side wall of the workpiece.

11. A method as set forth in claim 9 wherein said step of reducing the thickness of the side wall of the workpiece includes moving a cutting tool along the workpiece and forming a chip which curls off the workpiece in the same direction as in which the cutting tool is moving.

12. A method comprising the steps of providing an elongated workpiece having a relatively thick tubular side wall having a cylindrical outer side surface, rotating the workpiece about its central axis, supporting the workpiece against sidewise movement with a pair of elongated rolls having axial extents which are at least as great as the axial extent of a major portion of the cylindrical outer side surface of the workpiece, said step of supporting the workpiece with a pair of rolls includes engaging outer side surfaces of the rolls with the outer side surface of the workpiece throughout the length of at least major portions of the outer side surfaces of the rolls, and reducing the diametral thickness of the workpiece at areas of engagement of the rolls with the outer side surface of the workpiece and along at least a major portion of the axial extent of each of the rolls while continuing to perform said steps of rotating the workpiece and supporting the workpiece against sidewise movement, said step of reducing the diametral thickness of the workpiece includes leaving portions of the outer side surface of the workpiece in engagement with the outer side surfaces of the rolls at axially spaced apart support locations along the workpiece and reducing the thickness of the workpiece to 0.050 inches or less at locations which are disposed between the support locations and which have a combined axial extent which is at least as great as the axial extent of a major portion of each of the rolls while maintaining outer side surface areas of the workpiece at the support locations in continuous engagement with the rolls.

13. A method as set forth in claim 12 wherein said step of rotating the workpiece includes rotating the workpiece at speed of between 5,000 and 6,000 revolutions per minute.

14. A method as set forth in claim 12 wherein said step of reducing the thickness of the workpiece includes repeatedly moving a cutting tool along a path which is coextensive with at least a major portion of the axial extent of the rolls.

15. A method as set forth in claim 12 further including the steps of initially applying a relatively large axial tension force to the workpiece, reducing the axial tension force to less than one half of the relatively large tension force, and maintaining the reduced tension force on the workpiece throughout the step of reducing the diametral thickness of the workpiece.

16. A method as set forth in claim 12 wherein said step of reducing the thickness of the workpiece includes the steps of moving a cutting tool along the workpiece at locations which are disposed between the support locations and forming a chip which curls off the workpiece in the same direction as in which the cutting tool is moving.

17. A method comprising the steps of providing an elongated workpiece having a generally cylindrical initial outer side surface, said step of providing an elongated workpiece includes the step of providing a workpiece having a relatively thick tubular side wall upon which the cylindrical initial outer side surface of the workpiece is disposed, rotating the workpiece about its central axis, supporting the workpiece against sidewise movement by abuttingly engaging the initial outer side surface of the workpiece with an elongated roll at an area of engagement having an axial extent which is at least as great as the axial extent of a major portion of the cylindrical initial outer side surface of the workpiece, and reducing the diametral thickness of at least a major portion of the axial extent of the workpiece at areas of engagement of the initial outer side surface of the workpiece with the roll while continuing to perform said steps of rotating the workpiece and supporting the workpiece against sidewise movement, said step of reducing the diametral thickness of the workpiece includes leaving portions of the initial outer side surface of the workpiece in abutting engagement with the roll at axially spaced apart support locations along the workpiece and eliminating engagement of the roll with spaced apart portions of the workpiece by reducing the thickness of the side wall of the workpiece at locations between the support locations and where the roll previously engaged the initial outer side surface of the workpiece.

18. A method as set forth in claim 17 further including the initially applying a relatively large axial tension force to the workpiece, reducing the tension force to less than one half of the relatively large tension force before starting to perform said step of reducing the diametral thickness of the workpiece, and maintaining the reduced tension force on the workpiece throughout performance of said step of reducing the diametral thickness of the workpiece.

19. A method as set forth in claim 18 wherein said step of reducing the thickness of the side wall of the workpiece includes reducing the thickness of the side wall to 0.050 inches or less.

20. A method as set forth in claim 19 wherein said step of rotating the workpiece includes rotating the workpiece at a speed of between 5,000 and 6,000 revolutions per minute.

21. A method as set forth in claim 20 wherein said step of reducing the thickness of the workpiece includes the steps of moving a cutting tool along the workpiece and forming a chip which curls off the workpiece in the same direction as in which the cutting tool is moving.

22. A tubular product having a side wall with axially extending cylindrical thin wall sections having a thickness of 0.050 inches or less and thick side wall sections between the thin wall sections, the thin wall sections having a combined axial extent which is substantially greater than the combined axial extent of the thick side wall sections, said product being made by a method which includes the steps of providing an elongated tubular workpiece having a relatively thick side wall and a cylindrical outer side surface, axially tensioning the workpiece, rotating the workpiece about its central axis, supporting the workpiece against sidewise movement with a pair of rolls having cylindrical outer side surfaces with an axial extent which is at least as great as the axial extent of a major protion of the cylindrical outer side surface of the workpiece, said step of supporting the workpiece with a pair of rolls including engaging the outer side surface of the workpiece with the outer side surfaces of the rolls throughout the length of the outer side surfaces of the rolls, and, thereafter reducing the radial thickness of the sidewall of the workpiece to 0.050 inches or less at a plurality of spaced apart locations along the workpiece while continuing to perform said steps of axially tensioning the workpiece, rotating the workpiece and supporting the workpiece with a pair of rolls, said step of reducing the thickness of the side wall of the workpiece at spaced apart locations includes leaving annular sections having a relatively large radial thickness between and projecting radially outwardly from areas of reduced thickness, said step of continuing to support the workpiece includes engaging the annular sections with the outer side surfaces of the rolls while maintaining the outer side surfaces of the rolls spaced from the areas of reduced thicknesses.

* * * * *